(12) United States Patent
Liebler-Ranzus et al.

(10) Patent No.: US 8,027,424 B2
(45) Date of Patent: Sep. 27, 2011

(54) FUEL ELEMENT FOR A BOILING WATER REACTOR

(75) Inventors: Michael Liebler-Ranzus, Heilsbronn (DE); Erhard Friedrich, Eckental (DE)

(73) Assignee: Areva NP GmbH, Erlangen (DE)

( * ) Notice: Subject to any disclaimer, the term of this patent is extended or adjusted under 35 U.S.C. 154(b) by 659 days.

(21) Appl. No.: 11/547,520

(22) PCT Filed: Mar. 3, 2005

(86) PCT No.: PCT/EP2005/002213
§ 371 (c)(1),
(2), (4) Date: Dec. 29, 2006

(87) PCT Pub. No.: WO2005/098356
PCT Pub. Date: Oct. 20, 2005

(65) Prior Publication Data
US 2007/0274431 A1    Nov. 29, 2007

(30) Foreign Application Priority Data
Apr. 2, 2004  (DE) .......................... 10 2004 016 263

(51) Int. Cl.
*G21C 15/00* (2006.01)
*G21C 3/34* (2006.01)
*G21C 3/32* (2006.01)
(52) U.S. Cl. .................. 376/446; 376/362; 376/440
(58) Field of Classification Search .............. 376/440, 376/446, 362
See application file for complete search history.

(56) References Cited

U.S. PATENT DOCUMENTS

| | | | | | |
|---|---|---|---|---|---|
| 3,992,259 | A | * | 11/1976 | Anthony et al. | 376/440 |
| 4,095,558 | A | * | 6/1978 | Ellegast et al. | 118/420 |
| 4,452,755 | A | * | 6/1984 | Hylton | 376/364 |
| 5,289,514 | A | | 2/1994 | Lippert et al. | |
| 6,226,343 | B1 | | 5/2001 | Fredrickson et al. | |
| 6,690,758 | B1 | * | 2/2004 | Elkins | 376/313 |
| 7,453,972 | B2 | * | 11/2008 | Hellandbrand et al. | 376/446 |

FOREIGN PATENT DOCUMENTS
EP  1 280 163 A1  1/2003
* cited by examiner

*Primary Examiner* — Rick Palabrica
*Assistant Examiner* — Erin M B Leach
(74) *Attorney, Agent, or Firm* — Laurence A. Greenberg; Werner H. Stemer; Ralph E. Locher

(57) ABSTRACT

A fuel assembly for a boiling-water reactor has a water channel and a fuel assembly base, made from a sieve plate and a frame section enclosing the same. The water channel supports a plug with a bore running therethrough, at the lower end thereof, to which the fuel assembly base is fixed. The fuel assembly further comprises an opening through the sieve plate, a skirt, formed on the underside of the plug, surrounding the bore, extending into the opening in the sieve plate, a bush, provided with a first and a second longitudinal section, whereby the first longitudinal section extends from the underside of the sieve plate into the opening in a rotationally-fixed manner and a radial shoulder is provided between the two sections which contacts the underside of the sieve plate. A threaded section of a screw extends through the bush which engages in a thread in the bore in the plug.

8 Claims, 6 Drawing Sheets

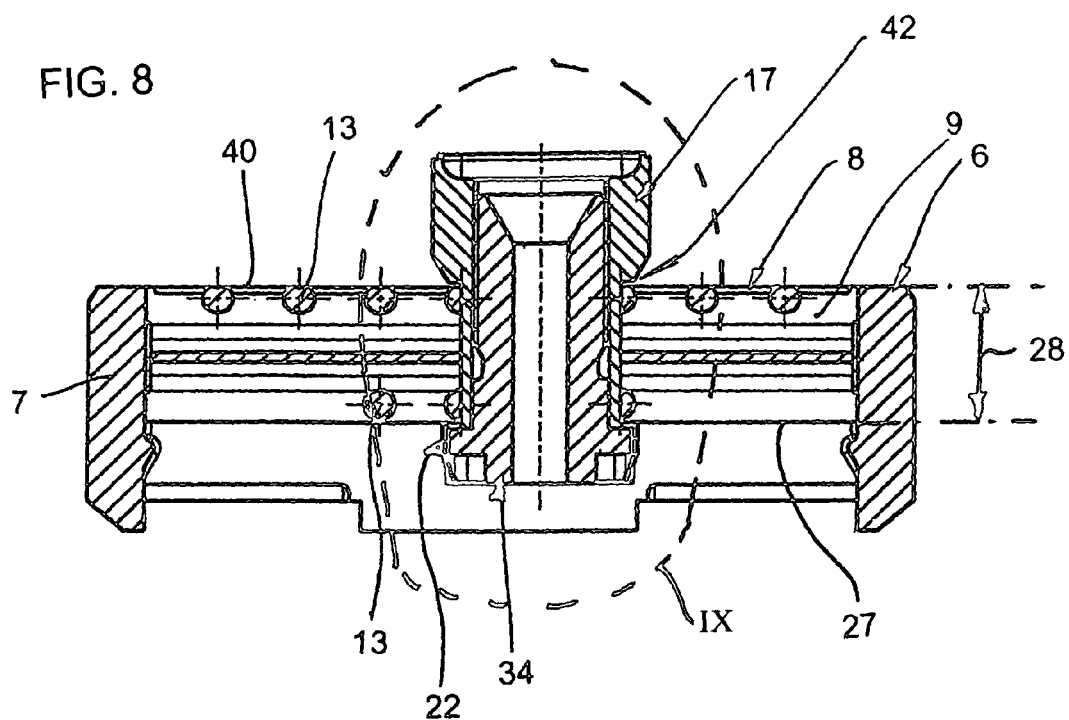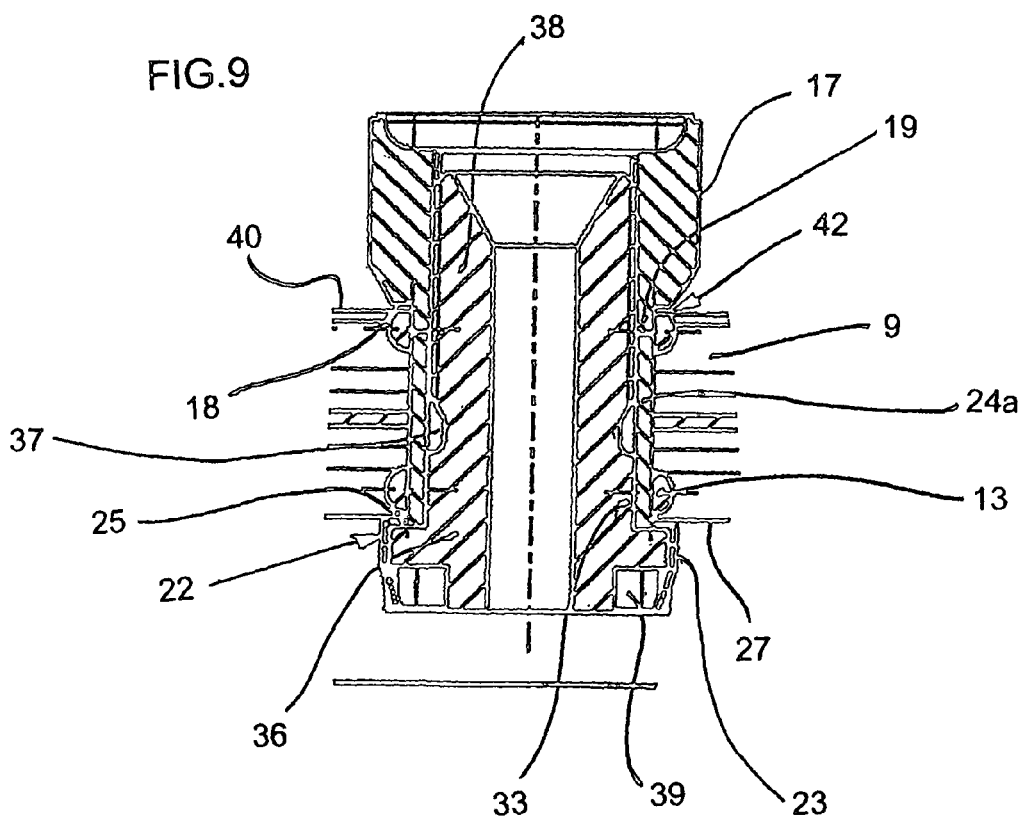

FUEL ELEMENT FOR A BOILING WATER REACTOR

BACKGROUND OF THE INVENTION

Field of the Invention

The invention relates to a fuel assembly for a boiling water reactor. A fuel assembly of this type comprises a bundle of fuel rods filled with nuclear fuel, which are held axially by a plurality of spacers. A water channel runs approximately centrally in the fuel-rod bundle, the lower end of the water channel carrying a stopper, through which a bore passes. The water channel is attached to the fuel assembly foot with the aid of said stopper. The fuel assembly foot itself, or at least part thereof, is formed by a frame part surrounding a sieve plate. In a fuel assembly known from EP 1 280 163 A1, the sieve plate includes a bore, into which a threaded sleeve is inserted from the underside of the sieve plate and soldered there. A soldering of this type requires an increased manufacturing outlay and is also problematic with respect to fatigue strength during use in a nuclear reactor.

SUMMARY OF THE INVENTION

It is an object of the invention to provide a fuel assembly for a boiling water reactor, in which the fuel assembly foot is connected to the water channel in an alternative manner.

This object is achieved by a fuel assembly with a skirt that is integrally formed on the underside of the stopper, which is arranged at the lower end of the water channel, and extends, in a rotationally-fixed manner, into an opening passing through the sieve plate. Furthermore, a bush is provided, having a first and a second longitudinal section, wherein the second longitudinal section projects from the underside of the sieve plate into the opening of the latter in a rotationally-fixed manner and wherein the outer side of a radial shoulder located between the two longitudinal sections bears against the underside of the sieve plate. Finally, the threaded bolt of a screw passes through the bush, which engages in a thread of the bore of the stopper. It is an advantage of the described connection that it completely dispenses with the complicated production of welded or soldered seams and therefore has a high fatigue strength, on the one hand, and low assembly outlay, on the other hand. The rotationally-fixed engagement of the skirt in the opening of the sieve plate rules out a change in the rotational position between water channel and fuel assembly foot. The rotational connection is preferably achieved in that the skirt has a polygonal contour and a region (which surrounds the skirt) of the screen-plate opening has a cross-sectional area complementary thereto.

In a preferred embodiment, the mutually facing end faces of the second longitudinal section and of the skirt bear against one another, wherein the lengths of bush and skirt are such that there is a gap between the underside of the stopper and the upper side of the sieve plate. Thereby the prestress of the threaded bolt which is required for a fixed screw-connection is achieved by producing stress between the bush and the stopper. The sieve plate remains free from any introduction of force in the axial direction here. This is advantageous if the sieve plate is formed by elements flexible in said direction, for example by webs, which are arranged parallel to one another and have a curvature in the axial direction. When applying force in the axial direction, there is a risk that the webs will flex and the screw-connection will lose strength as a result. The proposed refinement, however, prevents this effectively.

In order to prevent the screw from loosening by itself, the bush is arranged in the opening of the sieve plate in a rotationally-fixed manner and the screw is connected to the bush in a rotationally-fixed manner. In a preferred refinement, this is achieved in that the second longitudinal section of the bush has a polygonal contour and a region (which surrounds the bush) of the screen-plate opening has a cross-sectional area complementary thereto. The rotational lock between bush and screw is such that a circumferential region of the first longitudinal section of the bush interacts with the head of the bush in a torque-locking manner on account of a radially inwardly facing plastic deformation.

The water channel is attached to the fuel assembly foot transversely with respect to the axial direction without play and in particular secure against tilting on account of the threaded bolt having a preferably thread-free longitudinal section, which extends away from the screw head and bears against the inner face of the bush by its outer circumferential face.

The invention is now explained further by means of the exemplary embodiments illustrated in the attached drawings, wherein:

BRIEF DESCRIPTION OF THE DRAWINGS

FIG. 8 shows a cross section through the fuel assembly foot in the installed state, and FIG. 9 shows the part IX in FIG. 8.

DESCRIPTION OF THE PREFERRED EMBODIMENTS

Figure 1:
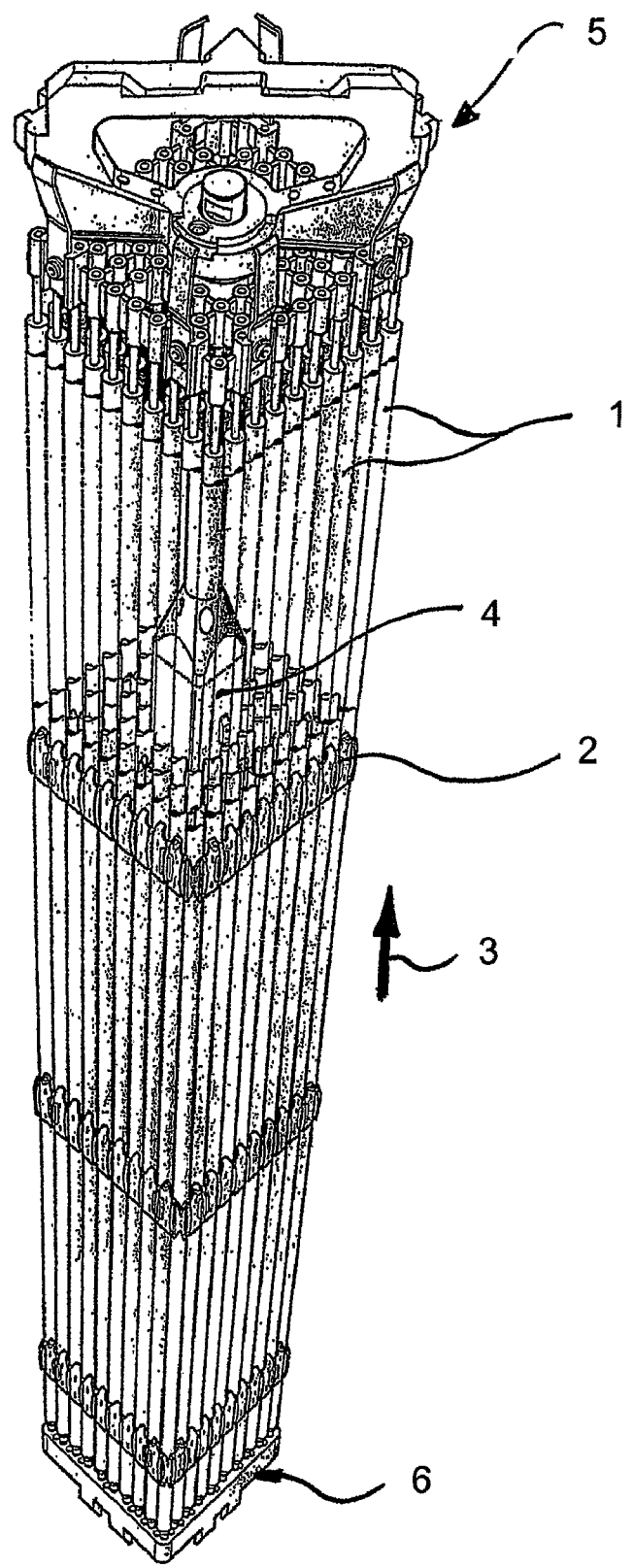
FIG. 1 shows a perspective illustration of a fuel assembly of a boiling water reactor.

FIG. 1 shows a fuel assembly of a boiling water reactor comprising a bundle of a multiplicity of fuel rods 1 filled with nuclear fuel. The fuel rods are attached laterally by a plurality of spacers 2 arranged in different axial positions. A water channel 4 extends in the axial direction 3 approximately centrally in the fuel-rod bundle. A fuel assembly top fitting 5 is arranged at the upper side of the fuel assembly and a fuel assembly foot 6 is arranged at the lower side.

Figure 2:
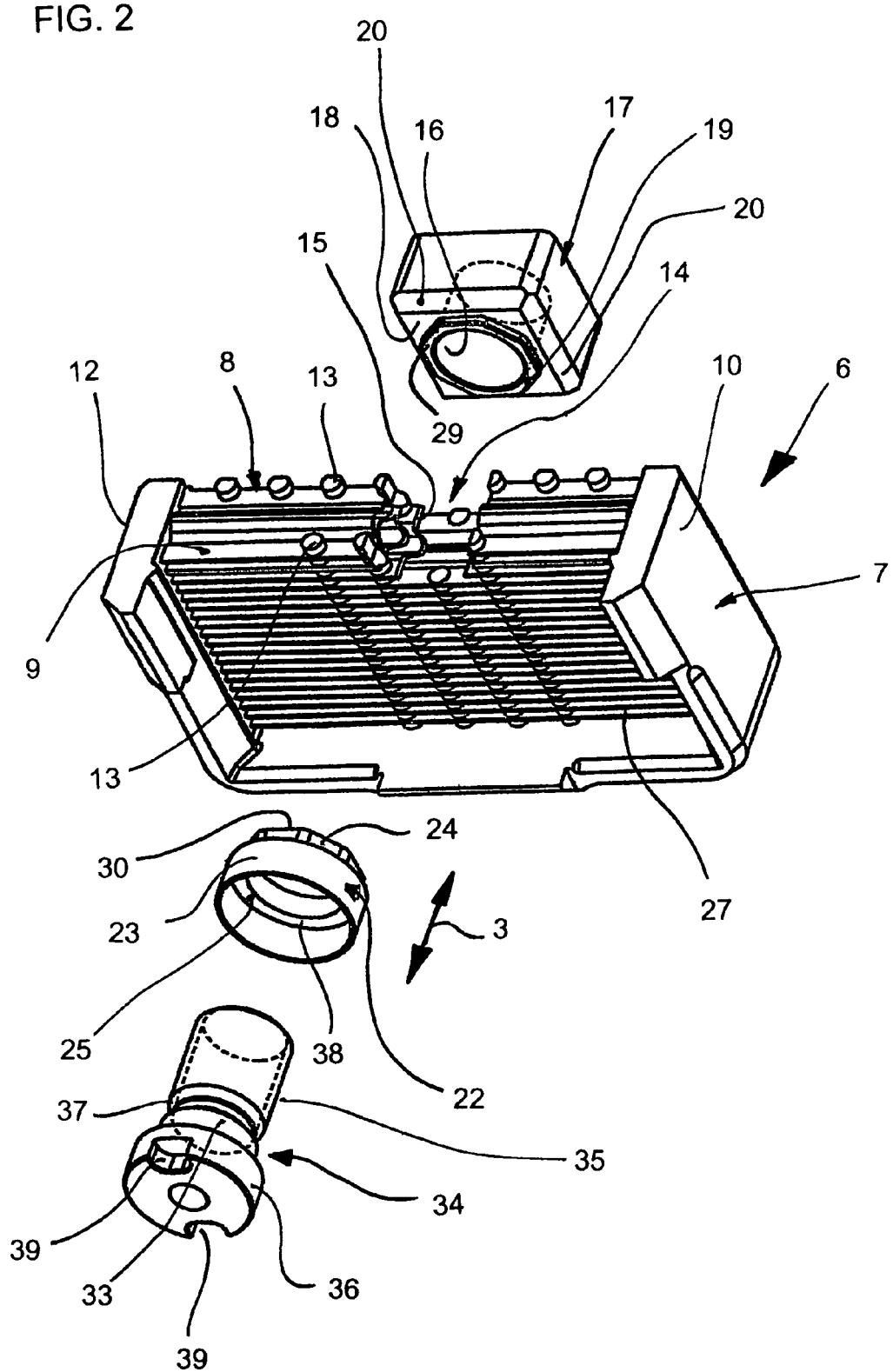
FIG. 2 shows a perspective exploded illustration clarifying the attachment of a water channel to a fuel assembly foot.

The fuel assembly foot 6 substantially comprises, as can be seen in FIG. 2, for example, a frame part 7 and a sieve plate 8. The sieve plate 8 is formed by a multiplicity of webs 9, which extend between two opposite walls 10, 12 of the frame part 7. The webs 9 are arranged, at a distance from one another, transversely with respect to their longitudinal direction. They are connected to one another in the same direction by struts 13 integrally formed thereon.

An opening 14 passes through the sieve plate 8 at an eccentric position. The inner cross-sectional area of the opening 14 is in the shape of an octagon. To be more precise, the rims 15 (which define the opening 14) of the webs 9 bear against an imaginary cylinder of octagonal outline. For the purpose of attaching to the fuel assembly foot 6, a stopper 17, through which a threaded bore 16 passes, is arranged at the lower end of the water channel 4. A skirt 19 surrounding the threaded bore 16 projects in the axial direction from the underside 18 of the stopper 17, which underside faces the sieve plate 8 in the installed state. The outer circumferential face of the skirt 19 forms an octagonal cylinder casing and extends, in a rotationally-fixed manner, into the complementary opening 14 of the sieve plate 8. The stopper 17 itself has an approximately square contour. The edges 20 delimiting the underside 18 of the stopper 17 are beveled.

Figure 5:
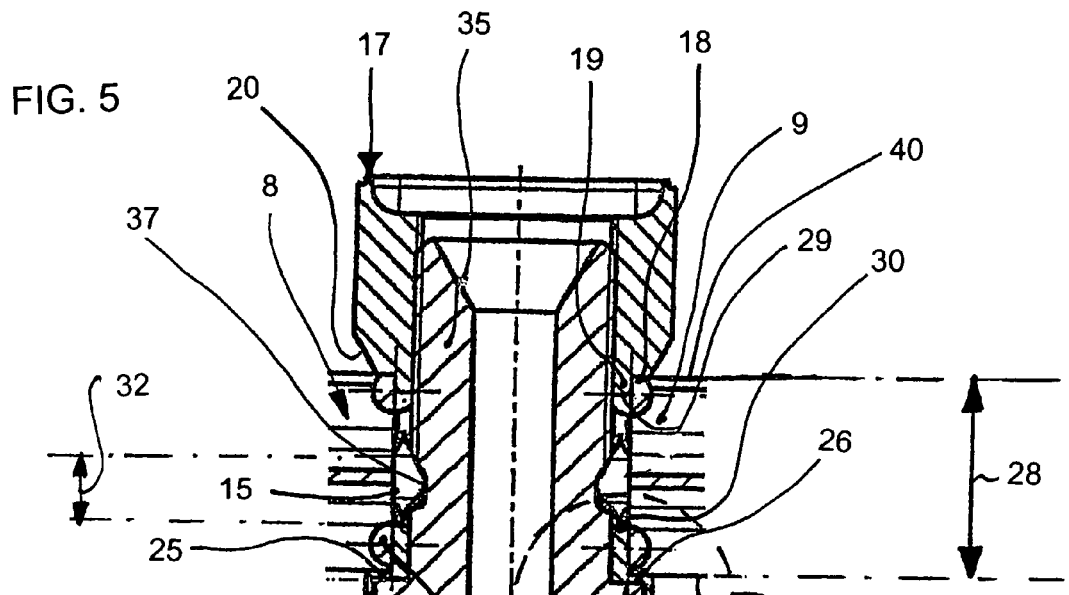
FIG. 5 shows the detail V in FIG. 3.
Figure 6:
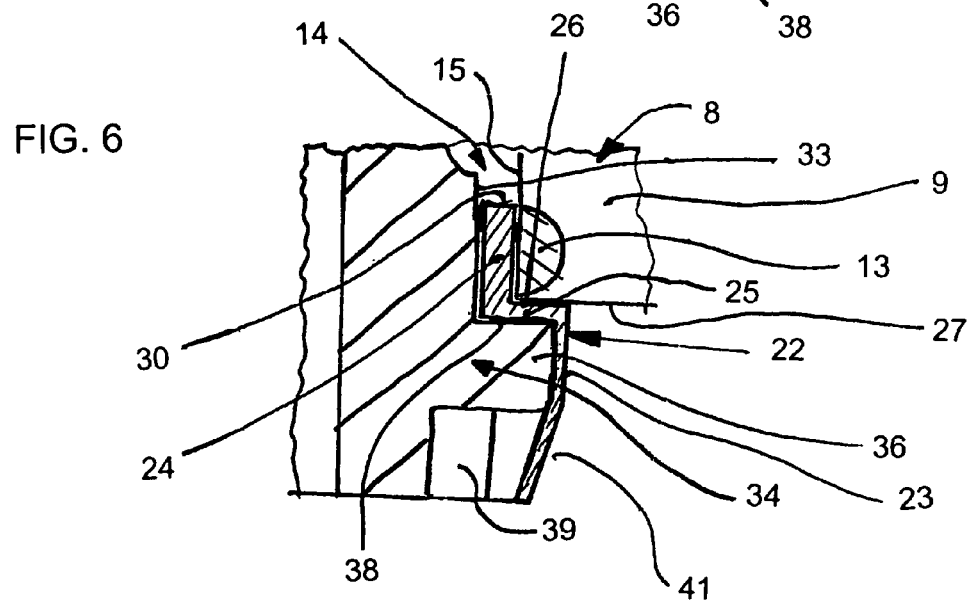
FIG. 6 shows the detail VI in FIG. 5.

A bush 22, which is subdivided into a first and a second longitudinal section 23, 24, is furthermore provided for the purpose of attaching the stopper 17 and the water channel 4. A radial shoulder 25 is arranged between the two longitudinal sections, as can best be seen in FIG. 6. The first longitudinal section 23 is annular and has a larger diameter than the second longitudinal section 24, which has an octagonal outline complementary to the opening 14. In the installed state (FIG. 3, 5, 6), said second longitudinal section 24 extends into the opening 14 in a rotationally-fixed manner. The bush 22 bears here against the underside 27 of the sieve plate 8, and the webs 9 forming it, by the outer side 26 of the radial shoulder 25. The length of the skirt 19 and of the second longitudinal section 24 of the bush 22 is in each case such that their sum is smaller than the thickness 28 (FIG. 5) of the sieve plate 8 or the height of the webs 9 forming it. Therefore there is an axial distance 32 between the mutually facing end faces 29, 30 of skirt 19 and bush 22.

Furthermore, a screw 34 having a threaded bolt 35 and a head 36 is provided for attaching the water channel 4, wherein the threaded bolt 35 extends through the bush 22 and into the threaded bore 16 of the stopper 17. The threaded bolt 35 has a thread-free collar 33 extending axially away from the head 36. A recess 37 is located between the collar 33 and that section of the threaded bolt 35 which has a thread. The head 36 is supported on the inner side 38 of the radial shoulder 25. The bush 22 is thereby pressed against the underside 27 of the sieve plate 8 by the outer side 26 of the radial shoulder in the stressed state. The underside 18 of the stopper 17 here presses against the upper side 40 of the sieve plate.

Figure 3:
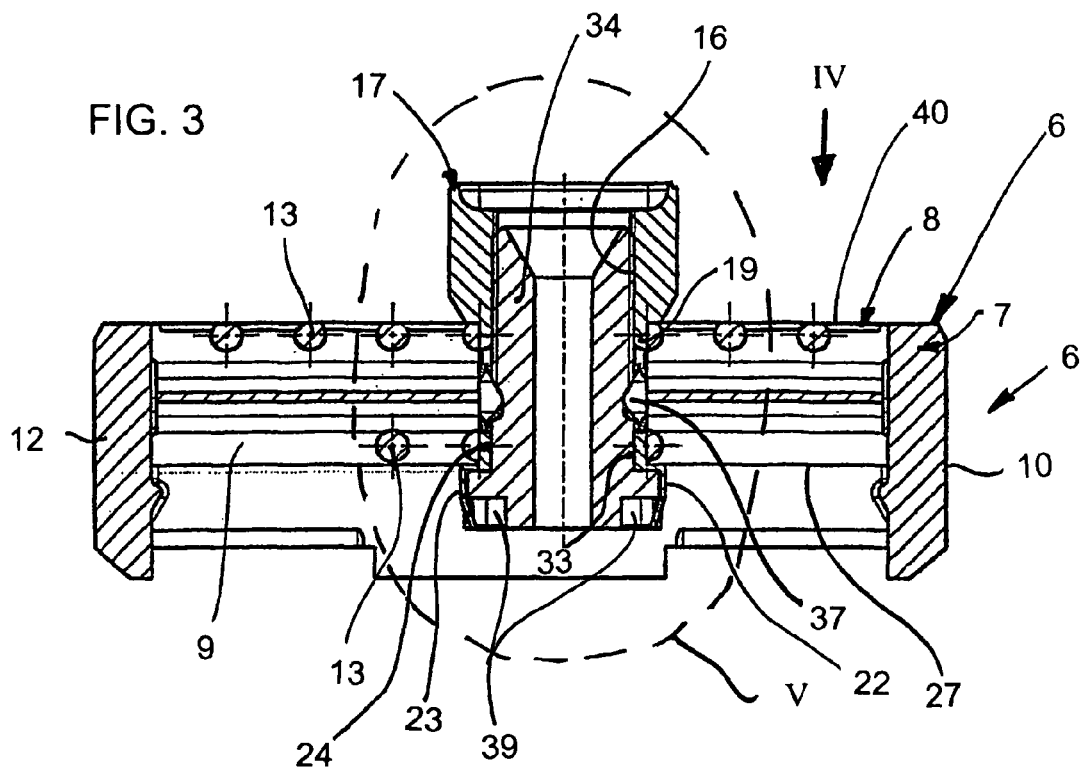
FIG. 3 shows a cross-sectional illustration of a fuel assembly foot.
Figure 4:
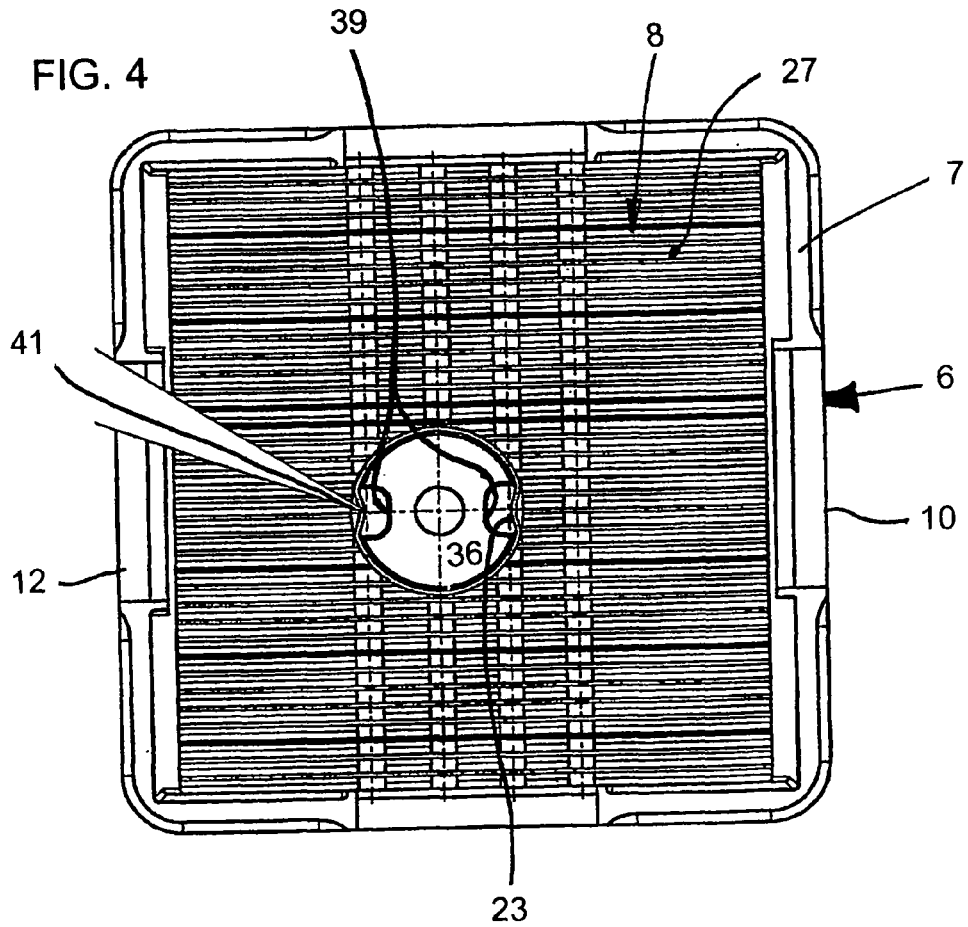
FIG. 4 shows a plan view in the direction of the arrow IV in FIG. 3.

The fuel assembly foot 6, the bush 22 and the screw 34 are made of austenite. The water tank and the stopper 17 bounding it on the underside, on the other hand, are made of zircaloy. The first longitudinal section 23 of the bush 22 has a wall thickness which permits a radially inwardly directed deformation 41. As can be seen in FIGS. 3 and 4, two such deformations 41 have been realized at diametrically opposed locations of the first longitudinal section 23. The deformations 41 extend into two diametrically opposed notches 39 in the head 36. This fixes the screw 34 with respect to the bush 22 in terms of rotation. The latter, in turn, is fixed in terms of rotation in the opening 14. The screw 34 is thereby prevented from loosening by itself.

Figure 7:
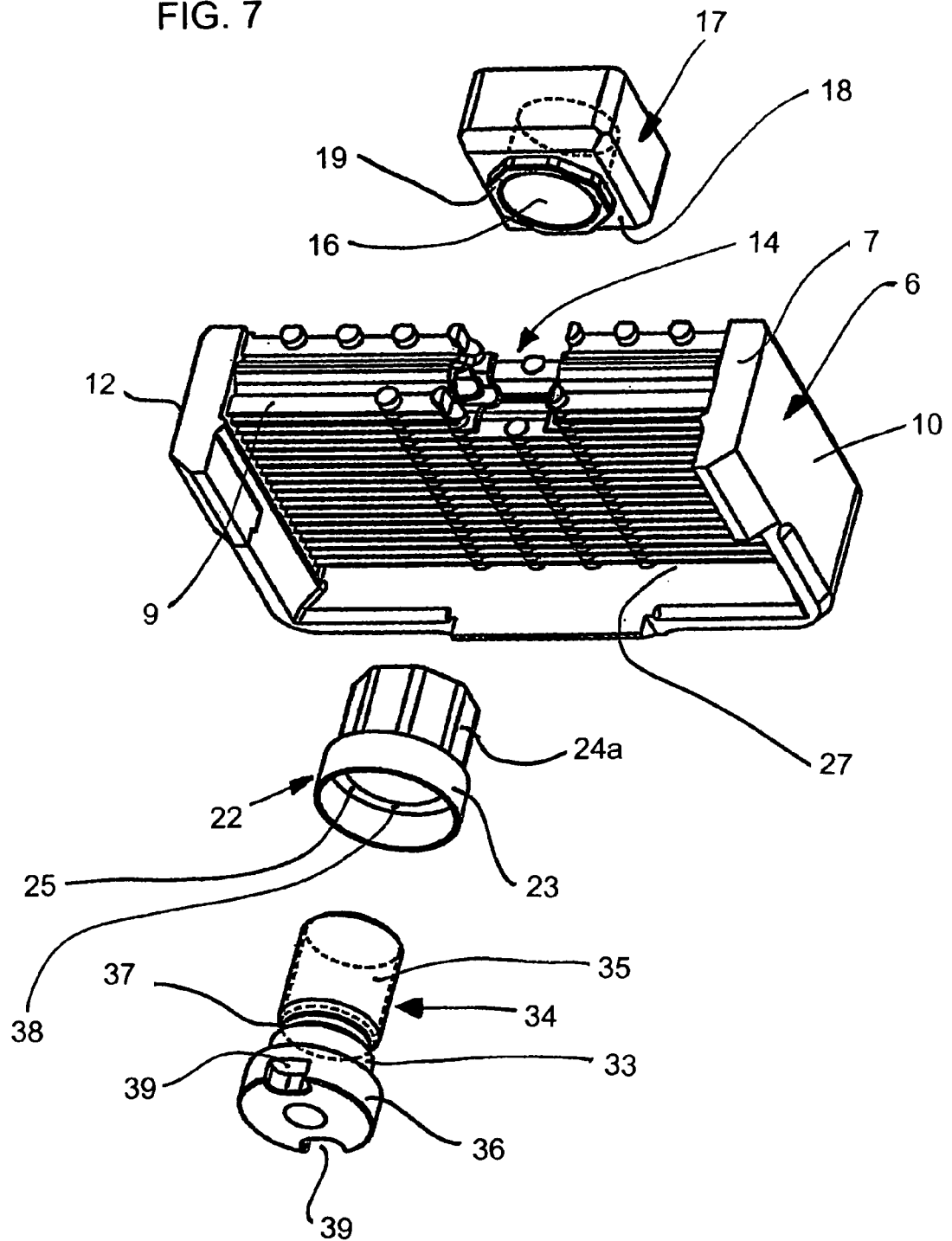
FIG. 7 shows a perspective exploded illustration of a second exemplary embodiment.

The exemplary embodiment illustrated in FIG. 7-9 differs from that mentioned above merely in that the longitudinal section 24a of the bush 22 is longer, wherein the length of said section and the length of the skirt 19 are such that their sum is greater than the thickness 28 of the sieve plate 8. This forms a gap 42 between the upper side 40 of the sieve plate 8 and the underside 18 of the stopper 17. During stressing, the stopper 17 is therefore not supported on the upper side 40 of the sieve plate 8, but on the bush 22. This eliminates the risk that the webs 9 corrugated in the axial direction 3 will flex resiliently in this direction, which would lead to an undesired deformation of the webs in the axial direction under certain circumstances to produce the required prestress.

REFERENCE LIST 1 fuel rod
2 spacer
3 axial direction
4 water channel
5 fuel assembly
6 fuel assembly foot
7 frame part
8 sieve plate
9 web
10 wall
12 wall
13 strut
14 opening
15 edge
16 threaded bore
17 stopper
18 underside
19 skirt
20 edge
22 bush
23 first longitudinal section
24 second longitudinal section
25 radial shoulder
26 outer side
27 underside
28 thickness
29 end face
30 end face
32 axial distance
33 color
34 screw
35 threaded bolt
36 head
37 recess
38 inner side
39 notch
40 upper side
41 deformation
42 gap

We claim:
1. A fuel assembly for a boiling water reactor, comprising:
a fuel assembly foot formed of a sieve plate with an opening passing therethrough and a frame part surrounding said sieve plate;
a water channel having a lower end carrying a stopper formed with a bore and being attached to said fuel assembly foot;
a skirt integrally formed on an underside of said stopper, surrounding said bore and extending into said opening in said sieve plate;
a bush having a first and a second longitudinal section, said second longitudinal section projecting into said opening in a rotationally-fixed manner, said bush having a radial shoulder disposed between said first and second longitudinal sections and bearing directly against the underside of said sieve plate; and
a threaded bolt of a screw passing through said bush and engaging in a thread of said bore of said stopper.

2. The fuel assembly according to claim 1, wherein said skirt has a polygonal contour and a region of said opening in said sieve plate, which surrounds said skirt, has a cross-sectional area complementary said polygonal contour.

3. The fuel assembly according to claim 1, wherein mutually facing end faces of said second longitudinal section of said bush and of said skirt bear against one another, and wherein said bush and said skirt have respective lengths so as to define a gap between an underside of said stopper and an upper side of said sieve plate.

4. The fuel assembly according to claim 1, wherein said bush is mounted in said opening in a rotationally-fixed manner and said screw is connected to said bush in a rotationally-fixed manner.

5. The fuel assembly according to claim 4, wherein said second longitudinal section of said bush has a polygonal contour and a region of said opening in said sieve plate, which surrounds said bush, has a cross-sectional area complementary thereto, and wherein a circumferential region of said first longitudinal section has a radially inwardly facing plastic deformation interacting with a head of said screw in a torque-locking manner.

6. The fuel assembly according to claim 5, wherein said threaded bolt has a thread-free collar extending away from said head and bears against an inner face of said first longitudinal section of said bush by an outer circumferential face thereof.

7. The fuel assembly according to claim 1, wherein said skirt extends into said opening and said skirt has a skirt contour and a region of said opening in said sieve plate, which surrounds said skirt, has a mating contour for said skirt contour to rotational fix said stopper.

8. The fuel assembly according to claim 1, wherein said underside of said stopper presses against an upper side of said sieve plate.

* * * * *